UNITED STATES PATENT OFFICE.

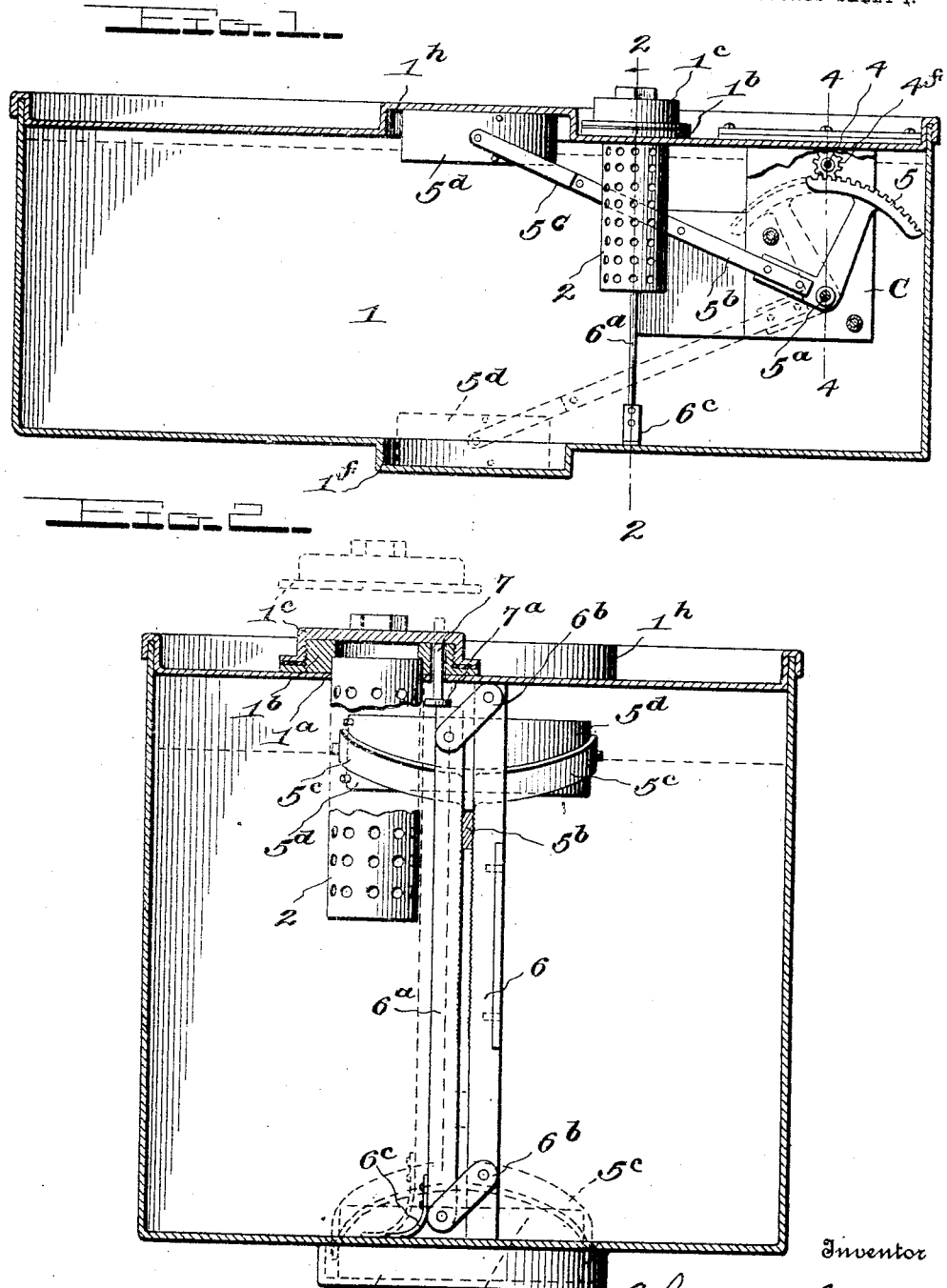

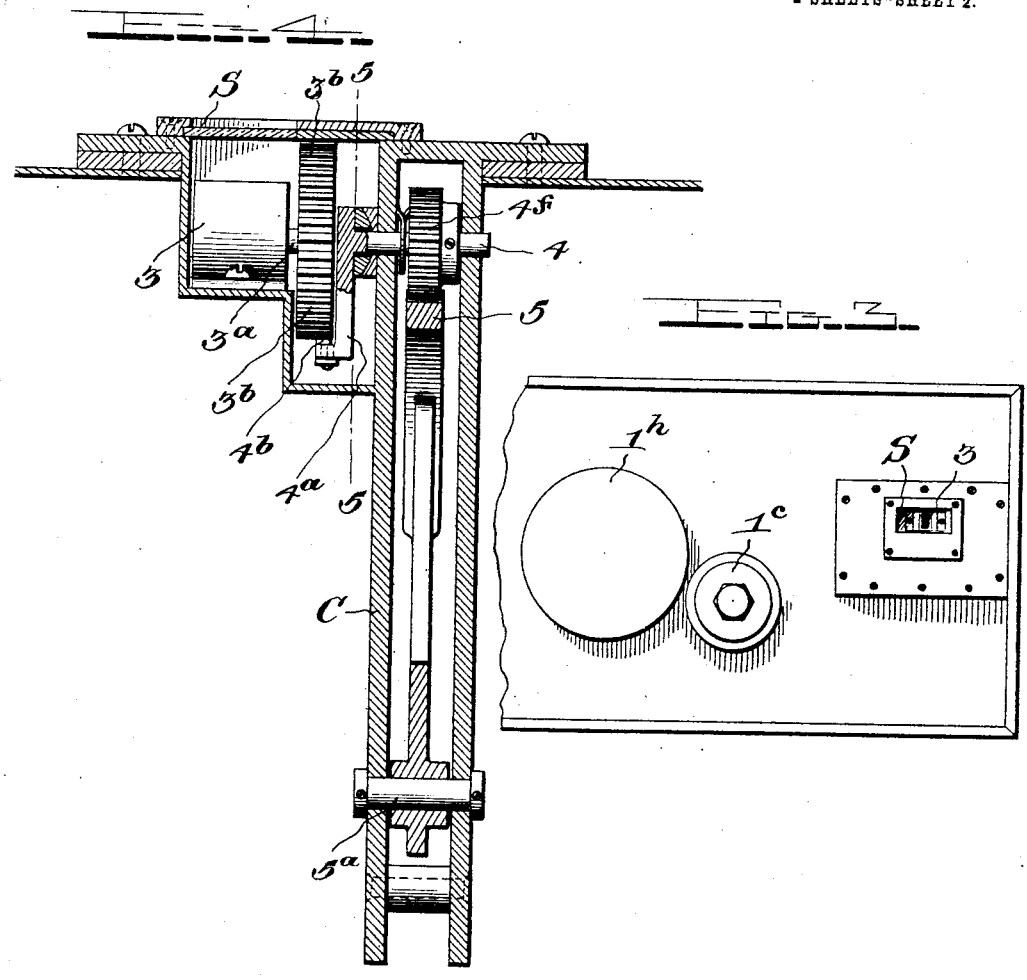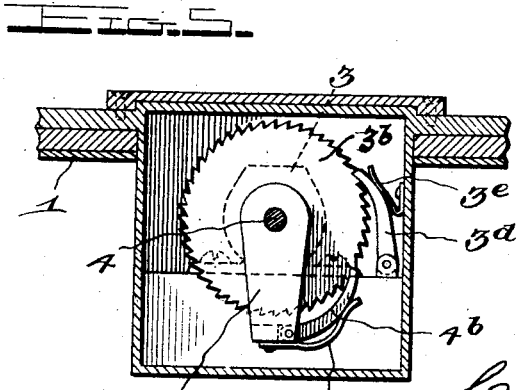

CHARLES F. BROWN, OF NEW YORK, N. Y., ASSIGNOR TO UNIVERSAL LIQUID REGISTER COMPANY, OF NEW YORK, N. Y., A CORPORATION OF NEW YORK.

AUTOMOBILE LIQUID-FUEL-TANK REGISTER.

1,134,585.  Specification of Letters Patent.  Patented Apr. 6, 1915.

Application filed December 20, 1913. Serial No. 807,912.

*To all whom it may concern:*

Be it known that I, CHARLES F. BROWN, a citizen of the United States, residing at New York, in the county of New York and State of New York, have invented certain new and useful Improvements in Automobile Liquid-Fuel-Tank Registers; and I hereby declare that the following is a full, clear, and exact description thereof, reference being had to the accompanying drawings, which form part of this specification.

This invention is a novel liquid fuel tank register particularly designed for use in fuel tanks of automobiles; and the object of the invention is to provide means for registering the amount of liquid introduced into such a tank and means for preventing tampering with the register, and means for locking the register each time the tank is closed so that it cannot be affected by jarring or splashing of the liquid, but when the tank is opened the register will be released so that the amount of liquid introduced into the tank will be registered thereby. The apparatus enables the owner of the tank to determine how much fluid has been supplied to him, and also the total amount of fuel consumed by him in a given time; and the apparatus will assist owners in detecting any cheating in false measurements of the fuel supplied, and also unwarranted use of the machine.

The apparatus practically comprises a tank, a register, a register actuating device in the tank, and means controlled by the opening and closing of the filling opening of the tank whereby when the filling opening is uncovered the registering mechanism is unlocked and will register the amount of liquid introduced into the tank through such opening, and whereby when said opening is closed the registering mechanism is positively locked and held locked after registration is effected.

Preferably the registering mechanism is actuated by a float and the invention additionally provides means for locking this float when the filling opening is closed so that the float and registering mechanism shall not be disturbed by vibration of the machine or the splashing of liquid in the tank.

One embodiment of the invention is illustrated in the accompanying drawings and I will describe same in detail with reference thereto and summarize in the claims the essential novel features and combinations of parts of the invention for which protection is desired.

In said drawings— Figure 1 is a longitudinal vertical sectional elevation of a liquid fuel tank showing the registering mechanism, and indicating in full lines the position of the float when the tank is filled and in dotted lines the position of the float when the tank is emptied and the filling opening uncovered. Fig. 2 is an enlarged transverse section on the line 2—2, Fig. 1, showing the register locking mechanism and float locking devices, the parts being shown with the float locked. Fig. 3 is a detail top plan view of part of the tank. Fig. 4 is an enlarged sectional view of the registering mechanism on line 4—4, Fig. 1. Fig. 5 is a transverse section on line 5—5, Fig. 4.

The tank 1 may be of any suitable construction and is preferably made of metal and hermetically sealed except at the filling opening 1$^a$ which may be closed by any suitable means, and is shown as surrounded by a threaded collar 1$^b$ which is engaged by an internally threaded cap 1$^c$. Suspended within the tank and surrounding the filling opening is a metallic strainer 2 of any suitable construction, which is adapted to strain the liquid as it is introduced into the tank, and prevents tampering with the float and registering mechanism in the tank.

The registering mechanism is contained in a metal casing suspended within the tank, and in brief comprises a register 3 which may be of any desired construction. On the operative shaft 3$^a$ of this register is secured a ratchet wheel 3$^b$. In axial alinement with this shaft 3$^a$ is a shaft 4 which is journaled in a depending part C of the casing; and this shaft 4 is provided with an arm 4$^a$ which carries a pawl 4$^b$, which is held in yielding engagement with the teeth of the ratchet 3$^b$ by a spring 4$^c$. The ratchet wheel 3$^b$ may be engaged by a pawl 3$^d$ held in engagement therewith by a spring 3$^e$ so as to prevent backlash or movement of the registering wheels.

On the shaft 4 is keyed a pinion 4$^f$ with which meshes a segmental rack 5, which is pivotally mounted on a pin 5$^a$ in the casing C, and to this segment 5 is attached an arm 5$^b$ which extends radially from the pivot 5$^a$ thereof and has a yoke 5ᶜ at its outer end, which is pivoted to a float 5ᵈ. As the float rises or falls segment 5 will be rocked, and when the float ascends motion is imparted to the shaft 4 by segment 5, and from shaft 4 to the shaft 3ᵃ by reason of dog 4ᵇ engaging ratchet 3ᵇ; thus the amount of liquid introduced into the tank will be registered as it is introduced therein by the rising of the float.

By properly proportioning the tank and the length of the float arm, the extent to which the float will be raised by a predetermined amount of liquid introduced into the tank can be determined. In practice I propose to make a gallon the unit of measure, and when the tank is being filled the amount put therein can be easily determined by noting the change in the numerals appearing at the sight opening S in the top plate of the casing C through which opening the numeral disks of the register 3 are visible.

After the desired amount of fluid is placed in the tank the filling opening is closed by the cap 1ᶜ, or other suitable means; and the float is locked so that the register cannot be actuated by agitation of the tank and the float shifted by jarring of the tank or splashing of the liquid therein. But when the tank is again opened up the float is released and allowed to drop by gravity. Preferably I provide a pocket 1ᶠ in the bottom of the tank which will remain substantially filled with liquid so that when the float drops it will be cushioned by the liquid in this pocket. A similar pocket 1ʰ may be provided at the top of the tank so as to permit the tank to be entirely filled with liquid.

It will be seen that the float is arranged practically at the central vertical axis of the tank. By so arranging the float it will accurately register the amount of liquid in the tank whether the tank be filled while inclined, or otherwise; for in such case the excess of liquid collected in the lower end of the tank will compensate for the insufficient amount of liquid at the high end of the tank, and therefore practically the register will operate accurately whether the tank be on a level or not.

For the purpose of guiding and locking the float I provide a pair of parallel bars 6, 6ᵃ disposed vertically in the tank adjacent the filling opening, and at opposite sides of the vertical plane traversed by the arm 5ᵇ of the float. The bar 6 is preferably rigidly secured in the tank, and the bar 6ᵃ is movably connected to the bar 6 by means of pivoted links 6ᵇ. The bar 6ᵃ is somewhat shorter than bar 6 and may be normally raised by means of a spring 6ᶜ attached to its lower end and resting on the bottom of the tank, and as this spring lifts bar 6ᵃ the links 6ᶜ cause bar 6ᵃ to move away from the bar 6 thus leaving sufficient space therebetween for the free movement of the lever 5ᵇ; but if bar 6ᵃ is depressed the links 6ᵇ will cause it to move toward bar 6 and thus clamp and bind lever 5ᵇ therebetween as indicated in Fig. 2.

A convenient way of depressing bar 6 is shown in the drawings and consists of a pin 7 guided in an aperture in collar 1ᵇ above the upper end of bar 6ᵃ, when the latter is in proper position in the tank; and this pin may have an enlarged head 7ᵃ on its lower end to prevent its being withdrawn through the aperture and to insure its operative contact with the upper end of bar 6ᵃ. When the cap 1ᶜ is removed the spring 6ᶜ causes bar 6ᵃ to rise lifting the pin 7 and freeing the lever 5ᵇ as indicated in dotted lines in Fig. 2; this permits the float to drop to the level of the liquid in the tank or to the bottom of the tank as indicated in Fig. 1, and as the tank is replenished with fuel the float rises and the amount of liquid introduced is registered as above stated.

In order to replace the cap 1ᶜ it is necessary to depress pin 7 and this depresses bar 6ᵃ, and as the cap 1ᶜ is screwed home the pin and rod are forcibly depressed and thus caused to securely clamp the lever 5ᵇ between the bars 6 and 6ᵃ. As indicated in Fig. 2 the opposed edges of the bars 6 and 6ᵃ and also the sides of the lever 5ᵇ may be roughened so as to insure a practically positive locking engagement between the said bars and the lever 5ᵇ while the closure 1ᶜ is in place, as indicated in Fig. 2. In this manner the float will be firmly held in the position to which it was raised by the fluid so long as the tank is closed and until the cap 1ᶜ is again removed; then the float will drop to the level of the fluid remaining in the tank.

It will be seen from the foregoing that when the cap 1ᶜ is removed the tank may be replenished with fuel, and that as fuel is poured into the tank the float will rise, and the amount of fluid introduced be registered, and the owner of the vehicle can, by observing the register at S, see whether or not the amount of fuel for which he is charged is supplied. He can also by observing the total amount registered see how much fuel has been supplied him in a given time.

What I claim is:

1. In combination, a tank having a filling opening, a closure for such opening; a register, means in the tank for actuating the register and means whereby the register actuating means is freed when the filling opening is uncovered and by which the register actuating means is locked against any movement when the filling opening is closed.

2. In combination with a tank having a filling opening, a closure for said opening, a registering mechanism, a float, means whereby the float controls the registering mechanism and means for locking said registering mechanism against any movement when the filling opening is closed.

3. In combination, a tank having a filling opening, a closure therefor, a registering mechanism, a float for operating said mechanism, and means whereby the float and registering mechanism are automatically locked against operative movement in either direction by the closing of the filling opening.

4. In combination with a tank having a filling opening, a closure for said opening, a registering mechanism, a float, a lever connecting the float with the registering mechanism, and means for rigidly clamping said float lever when the closure is applied.

5. In combination, a tank having a filling opening, a closure therefor, a registering mechanism, a float, a lever connecting the float to said registering mechanism, and means whereby the lever is automatically locked against any movement upon the closing of the filling opening and released by the opening thereof.

6. In combination with a fuel tank having a filling opening, a closure for said opening, a registering mechanism, a float, a lever connecting the float with the registering mechanism, and means for rigidly locking said float lever in position when the opening is closed.

7. In combination with a fuel tank having a filling opening, a closure for said opening, a registering mechanism in the tank, a float in the tank, a lever connecting the float with the registering mechanism, means for rigidly clamping said float lever and devices whereby said clamping means is caused to engage the lever when the closure is applied to the filling opening.

8. In combination with a fuel tank having a filling opening, a closure for said opening, a registering mechanism in the tank, a float located centrally in the tank, a lever connecting the float with the registering mechanism, and means for guiding said float lever, and devices whereby said lever is clamped when the closure is applied to the filling opening, and released when the closure is removed.

9. In combination, a tank having a filling opening and a closure therefor, a register and means whereby the register is locked when the filling opening is closed and released when the filling opening is opened, and means within the tank to prevent tampering with the register when the filling opening is open.

10. In combination with a fuel tank having a filling opening, and a closure for said opening; with a registering mechanism, a float, a lever connecting the float with the registering mechanism, means for locking said float lever when the opening is closed, and means within the tank to prevent tampering with the register when the filling opening is uncovered.

11. In combination, a tank having a filling opening, and a closure therefor; a register, a float actuated lever for operating said register, guide bars in said tank at opposite sides of said lever, one of said bars being movable toward the other, and means for causing said bars to clamp said lever when the closure is applied.

12. In combination, a tank having a filling opening, and a closure therefor, a register, a float actuated lever in the tank for actuating said register, parallel guide bars in said tank at opposite sides of said lever, one of said bars being movable toward the other, and a pin adjacent the opening adapted to be depressed by the closure and cause the movable bar to clamp the lever against the fixed bar, substantially as described.

13. In combination, a tank having a filling opening and a closure therefor, a register, a float actuated lever in the tank for actuating said register, parallel guide bars in said tank at opposite sides of said lever, one of said bars being movable toward the other, links connecting one of the bars to the other, and a pin adjacent the opening adapted to be depressed by the closure for the opening and cause the movable bar to clamp the lever against the fixed bar, substantially as described.

14. In combination with a fuel tank having a filling opening, a closure for said opening, a registering mechanism in the tank, a float in the tank, a lever connecting the float with the registering mechanism, means for guiding said float lever, devices whereby said lever is clamped when the closure is applied to the filling opening and released when the closure is removed; and means within the tank adjacent the filling opening to prevent tampering with the lever when the filling opening is uncovered.

In testimony that I claim the foregoing as my own, I affix my signature in presence of two witnesses.

CHARLES F. BROWN.

Witnesses:
A. D. DICKERSON,
A. F. FRIEDMAN.